(12) United States Patent
Kobayashi et al.

(10) Patent No.: US 8,620,546 B2
(45) Date of Patent: Dec. 31, 2013

(54) DRIVE STATE CONTROL APPARATUS FOR VEHICLE

(75) Inventors: Kazutaka Kobayashi, Nishio (JP); Yoshiyuki Aoyama, Nishio (JP); Takeshige Miyazaki, Chiryu (JP); Akihiro Ohno, Okazaki (JP); Ryohei Shigeta, Anjo (JP); Tomoaki Kato, Kariya (JP); Go Nagayama, Toyama (JP)

(73) Assignees: Aisin AI Co., Ltd., Nishio-Shi (JP); JTEKT Corporation, Osaka-Shi (JP)

(*) Notice: Subject to any disclaimer, the term of this patent is extended or adjusted under 35 U.S.C. 154(b) by 56 days.

(21) Appl. No.: 13/108,180

(22) Filed: May 16, 2011

(65) Prior Publication Data

US 2011/0282557 A1    Nov. 17, 2011

(30) Foreign Application Priority Data

May 17, 2010   (JP) ................................. 2010-113088

(51) Int. Cl.
| | | |
|---|---|---|
| G06F 17/00 | (2006.01) | |
| B60K 17/344 | (2006.01) | |
| B60K 17/354 | (2006.01) | |

(52) U.S. Cl.
CPC ............... *G06F 17/00* (2013.01); *B60K 17/344* (2013.01); *B60K 17/354* (2013.01)
USPC ................. 701/69; 701/68; 701/81; 701/82; 180/248

(58) Field of Classification Search
USPC ............................ 701/68, 69, 81, 82; 180/248
See application file for complete search history.

(56) References Cited

U.S. PATENT DOCUMENTS

| | | | |
|---|---|---|---|
| 4,609,064 A * | 9/1986 | Suzuki et al. ................. 180/233 |
| 5,407,024 A * | 4/1995 | Watson et al. ................ 180/248 |
| 7,497,297 B2 * | 3/2009 | Watson et al. ................ 180/248 |
| 2004/0034461 A1 * | 2/2004 | Kadota ............................ 701/67 |
| 2004/0040375 A1 * | 3/2004 | Kadota et al. ................... 73/116 |
| 2010/0094519 A1 | 4/2010 | Quehenberger et al. |

FOREIGN PATENT DOCUMENTS

| | | |
|---|---|---|
| JP | 2004-359213 | 12/2004 |
| JP | 3650255 B2 | 5/2005 |
| JP | 2008-230465 | 10/2008 |
| JP | 2010-100280 | 5/2010 |

* cited by examiner

*Primary Examiner* — Thomas Tarcza
*Assistant Examiner* — Tyler J Lee
(74) *Attorney, Agent, or Firm* — Burr & Brown, PLLC (57) ABSTRACT

An on-demand-type drive state control apparatus for a vehicle is provided. In the case where acceleration slippage occurs at drive wheels (rear wheels) of a vehicle when a drive system is in a two-wheel drive state, the drive system is switched from the two-wheel drive state to a four-wheel drive state. That is, the maximum transmittable torque of a multi-disc clutch mechanism increases from "0" to a predetermined value. In the four-wheel drive state, the maximum transmittable torque decreases stepwise from the present value by a predetermined value every time the vehicle travels over a predetermined distance in a state in which none of the wheels cause acceleration slippages. That is, the clutch drive current supplied to the multi-disc clutch mechanism decreases gradually (stepwise or in a plurality of steps), and the drive torque distributed to the front wheels (rear wheels) decreases (increases) gradually.

9 Claims, 8 Drawing Sheets

DRIVE STATE CONTROL APPARATUS FOR VEHICLE

BACKGROUND OF THE INVENTION

1. Field of the Invention

The present invention relates to a drive state control apparatus for a vehicle which can perform changeover between a two-wheel drive state and a four-wheel drive state.

2. Description of the Related Art

Conventionally, there has been widely known a transfer which includes an input shaft, a first output shaft, and a second output shaft (sac, for example, Japanese Patent No. 3050255). The input shaft is connected to an output shaft of a transmission connected to an engine of a vehicle. The first output shaft is connected to left and right rear wheels (first left and right wheels), and the second output shaft is connected to left and right front wheels (second left and right wheels).

This transfer includes a clutch mechanism which selectively establishes a "decoupled state" in which a power transmission system is formed only between the input shaft and the first output shaft, and a "coupled state" in which power transmission systems are formed between the input shaft and the first and second output shafts. This clutch mechanism is configured to be capable of adjusting maximum transmittable torque which is the maximum torque that can be transmitted in the "coupled state" the maximum drive torque that can be transmitted to the left and right front wheels).

The maximum transmittable torque is adjusted such that the greater the current for driving the clutch mechanism (an actuator within the clutch mechanism) (hereinafter referred to as "clutch drive current"), the greater the maximum transmittable torque. A state in which the maximum transmittable torque is "0" (or equal to or less than a very small value) corresponds to the "decoupled state"; and a state in which the maximum transmittable torque is greater than "0" (or the very small value) corresponds to the "coupled state." When the clutch mechanism is in the "decoupled state," there is established a "two-wheel drive state," in which a power transmission system is formed only between the engine of the vehicle and the left and right rear wheels. Meanwhile, when the clutch mechanism is in the "coupled state," there is established a "four-wheel drive state," in which a power transmission system is formed between the engine of the vehicle and the left and right rear wheels, and another power transmission system is formed between the engine and the left and right front wheels.

SUMMARY OF THE INVENTION

Incidentally, in recent years, some vehicular drive state control apparatuses including the above-described transfer are so-called on-demand-type apparatuses. Such an on-demand-type apparatus maintains a vehicle in the "two-wheel drive state" in an ordinary state, and automatically switches the drive state of the vehicle from the two-wheel drive state" to the "four-wheel drive state" only when the left and right rear wheels (the first left and right wheels) are determined to have slipped, for example, in a state in which the vehicle travels on a "road surface having a low road-surface friction coefficient."

In the case of the on-demand-type apparatus, when the vehicle drive state is set to the "four-wheel drive state," subsequently, the vehicle drive state must be switched from the "four-wheel drive state" to the "two-wheel drive state." In other words, the maximum transmittable torque must be decreased from the present value (>0) to "0" in the "four-wheel drive state." In this regard, a problem arises in determining a pattern in accordance with which the maximum transmittable torque is reduced. Patterns for decreasing the maximum transmittable torque will now be considered.

First, there is assumed a case (hereinafter referred to as the "first conventional example") in which the maximum transmittable torque is maintained at the present value (>0) for a relatively long time after the end of a state in which the wheels are determined to have slippage, and the maximum transmittable torque is then decreased stepwise from the present value to "0." In the case of the first conventional example, the following problem may arise. For example, in the case where the vehicle has already moved from a "road surface which is low in road surface friction coefficient" to a "road surface which is high in road surface friction coefficient," large slippage is unlikely to occur at the left and right rear wheels (the first left and right wheels) even if the vehicle is in the "two-wheel drive state." Even in such a situation, the clutch drive current is maintained at a large value for a relatively long time. That is, the clutch drive current is consumed wastefully.

Second, there is assumed another case (hereinafter referred to as the "second conventional example") where the maximum transmittable torque is reduced stepwise from the present value to "0" after elapse of a relatively short period of time after the end of a state in which the wheels are determined to have slippage. In the case of the second conventional example, the following problem may occur. For example, in the case where a "road surface which is low in road surface friction coefficient" continues, large slippage is likely to occur at the left and right rear wheels (the first left and right wheels) if the vehicle is in the "two-wheel drive state." Irrespective of such a situation, the vehicle drive state is immediately switched from the "four-wheel drive state" to the "two-wheel drive state." As a result, the drive torque transmitted to the left and right rear wheels increases suddenly, and large slippage may occur at the left and right rear wheels.

The present invention has been accomplished in order to solve the above-described problems, and an object of the present invention is to provide an on-demand-type drive state control apparatus for a vehicle which suppresses wasteful consumption of clutch drive current, which wasteful consumption would otherwise occur when the drive state of the vehicle is switched from a "four-wheel drive state" to a "two-wheel drive state," and which prevents occurrence of large slippage at wheels.

A drive state control apparatus for a vehicle (hereinafter may be referred to as the "vehicular drive state control apparatus") according to the present invention comprises a transfer, slippage determination means, and control means. The transfer includes an input shaft connected to an output shaft of a transmission connected to a power source of the vehicle, a first output shaft connected to first left and right wheels, which are left and right front wheels or left and right rear wheels, and a second output shaft connected to second left and right wheels which are remaining left and right wheels. The transfer further includes a clutch mechanism which selectively establishes a decoupled state in which a power transmission system is formed only between the input shaft and the first output shaft and a coupled state in which power transmission systems are formed between the input shaft and the first and second output shafts. The clutch mechanism can adjust maximum transmittable torque, which is the maximum torque transmittable to the second output shaft in the coupled state.

A state in which the maximum transmittable torque is "0" or a state in which the maximum transmittable torque is equal to or less than a very small value greater than "0" corresponds to the "decoupled state" (the "two-wheel drive state"); and a state in which the maximum transmittable torque is greater than "0" or a state in which the maximum transmittable torque is greater than the very small value corresponds to the "coupled state" (the "four-wheel drive state"). The very small value is a value of the drive torque transmitted to the second left and right wheels which is so small that it does not substantially contribute to acceleration of the vehicle. The clutch mechanism is configured such that the greater the current for driving the clutch mechanism (an actuator within the clutch mechanism), the greater the maximum transmittable torque.

The slippage determination means determines whether or not slippage occurs at the first and second left and right wheels. The control means switches the clutch mechanism from the decoupled state to the coupled state when at least one of the first left and right wheels is determined to have caused slippage in a state in which the clutch mechanism is in the decoupled state. That is, the vehicular drive state control apparatus of the present invention is an apparatus of the above-described on-demand type.

The feature of the vehicular drive state control apparatus of the present invention resides in that the control means is configured such that, when the vehicle is traveling and the clutch mechanism is in the coupled state, the control means executes an operation a plurality of times in which operation the maximum transmittable torque is decreased from a present value by a first predetermined amount every time a predetermined condition is satisfied.

The first predetermined amount may be the same value at all times or may vary each time. The first predetermined amount may be set to a value smaller than the lower limit value of the range of the maximum transmittable torque that may be set in the "coupled state." Alternatively, the first predetermined amount may be set such that its maximum value becomes smaller than the upper limit value of the range of the maximum transmittable torque that may be set in the "coupled state."

Bu virtue of the above-described configuration, in the "four-wheel drive state," the maximum transmittable torque decreases every time the predetermined condition is satisfied (i.e., decreases gradually (stepwise in a plurality of steps). In other words, the clutch drive current decreases every time the predetermined condition is satisfied; that is, decreases gradually (stepwise in a plurality of steps). Accordingly, as compared with the above-described first conventional example, wasteful consumption of the clutch drive current can be restrained. In addition, the drive torque transmitted to the first left and right wheels (drive wheels in the two-wheel drive state) increases every time the predetermined condition is satisfied; that is, the drive torque transmitted to the first left and right wheels increases gradually (stepwise in a plurality of steps). Accordingly, as compared with the above-described second conventional example, the first left and right wheels hardly cause large slippage.

Next, specific examples of the "predetermined condition" will be described. For example, preferably, the predetermined condition is such that a state in which the first and second left and right wheels are determined to have no slippage continues while the vehicle travels over a predetermined distance. In the case where this state continues, even when the drive torque transmitted to the first left and right wheels is increased slightly by means of decreasing the maximum transmittable torque slightly, conceivably, large slippage is unlikely to occur at the first left and right wheels. Accordingly, by means of determining the predetermined condition in this manner, it becomes possible to gradually decrease the maximum transmittable torque while stably maintaining a state in which large slippage does not occur at the first left and right wheels.

The predetermined condition may be such that a state in which the detected outside temperature is equal to or higher than a predetermined temperature continues for a predetermined time. Alternatively, the predetermined condition may be such that a state in which the detected rainfall amount is equal to or less than a predetermined amount continues for a predetermined time. Alternatively, the predetermined condition may be such that a state in which the first and second left and right wheels are determined to have no slippage at the time of start of the vehicle occurs a predetermined number of times continuously.

In the case where any of these conditions is satisfied, a road surface on which the vehicle is traveling is considered to be a "road surface which is high in road surface friction coefficient." That is, even when the drive torque transmitted to the first left and right wheels is increased slightly by means of decreasing the maximum transmittable torque slightly, conceivably, large slippage is unlikely to occur at the first left and right wheels. Accordingly, by means of determining the predetermined condition in one of these manners, it becomes possible to gradually decrease the maximum transmittable torque while stably maintaining a state in which large slippage does not occur at the first left and right wheels.

In the above-described vehicular drive state control apparatus, preferably, the control means is configured to increase the maximum transmittable torque from the present value by a second predetermined amount when at least one of the first left and right wheels is determined to have caused slippage in a state in which the clutch mechanism is in the coupled state.

By virtue of this configuration, in the case where the vehicle is in an instable state, such as a state in which slippage occurs at least one of the wheels, the proportions of the drive torques transmitted to the four wheels are changed such that the proportions become uniform. Accordingly, the degree of the slippage is restrained, and the vehicle can be placed in a more stable state.

In the above-described vehicular drive state control apparatus, the control means may be configured such that, in the case where the vehicle stops in the state in which the clutch mechanism is in the coupled state and the vehicle starts after that time, the control means sets the maximum transmittable torque to a value which is obtained by subtracting, from the value at the time of the previous start of the vehicle, a "total decrease amount increased on the basis of the first predetermined value in a period between the previous start of the vehicle to the present stoppage," and adding, to the value at the time of the previous start of the vehicle, a "total increase amount increased on the basis of the second predetermined value in a period between the previous start of the vehicle to the present stoppage."

The above-described vehicular drive state control apparatus may include a changeover mechanism (M) disposed in an axle (Afr) of a specific wheel, which is one of the second left and right wheels, and adapted to selectively establish a connected state in which a power transmission system is formed between the specific wheel and a differential (D/Ff) disposed between axles (Afr, Afl) of the second left and right wheels, and a disconnected state in which no power transmission system is formed between the differential and the specific wheel. In such a case, the control means may be configured to switch the changeover mechanism (M) from the disconnected state to the connected state when the clutch mechanism is switched from the decoupled state to the coupled state, and switches the changeover mechanism (M) from the connected state to the disconnected state when the clutch mechanism is switched from the coupled state to the decoupled state as a result of the maximum transmittable torque being decreased a plurality of number of times by the first predetermined amount for each time in a state in which the clutch mechanism is in the coupled state and the changeover mechanism is in the connected state.

DETAILED DESCRIPTION OF THE INVENTION

Figure 1:
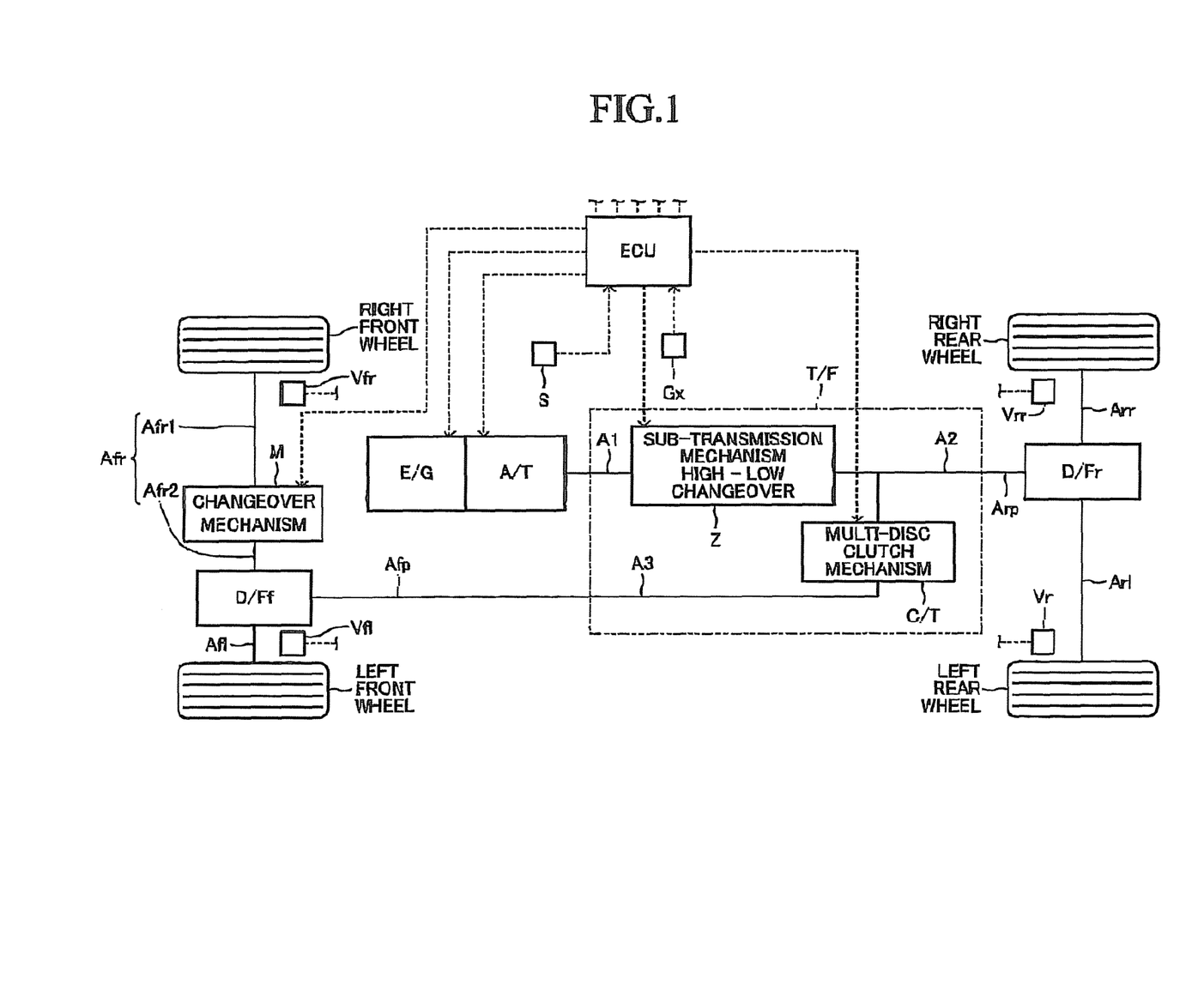
FIG. 1 is a diagram schematically showing a power transmission system of a vehicle on which a vehicular drive state control apparatus according to an embodiment of the present invention is mounted.

A vehicular drive state control apparatus according to an embodiment of the present invention (hereinafter also referred to as the "present apparatus") will now be described with reference to the drawings. FIG. 1 shows the power transmission system of a drive system of a vehicle on which the present apparatus is mounted. This drive system includes a transfer T/F, a rear-wheel-side differential D/Fr, a front-wheel-side differential D/Ff, a changeover mechanism M, wheel speed sensors Vfr, Vfl, Vrr, Vrl, a longitudinal acceleration sensor Gx, a 2WD/4WD changeover switch S, and an electronic control apparatus ECU.

The transfer T/F includes an input shaft A1, a first output shaft A2, and a second output shaft A3. The input shaft A1 is connected to an output shaft of an automatic transmission A/T connected to an engine E/G, and a power transmission system is formed between the input shaft A1 and the engine E/G. The first output shaft A2 is connected to the rear-wheel-side differential D/Fr via a rear-wheel-side propeller shaft Arp, and a power transmission system is formed between the first output shaft A2 and the rear-wheel-side differential D/Fr. The second output shaft A3 is connected to the front-wheel-side differential D/Ff via a front-wheel-side propeller shaft Afp, and a power transmission system is formed between the second output shaft A3 and the front-wheel-side differential D/Ff.

The transfer T/F includes a sub-transmission mechanism Z and a multi-disc clutch mechanism C/T. The sub-transmission mechanism Z has one of known configurations, and is configured to be switchable between a HIGH mode in which the ratio of rotational speed of the first output shaft A2 to that of the input shaft A1 becomes "1," and a LOW mode in which the ratio becomes a constant value less than "1."

The multi-disc clutch mechanism C/T has one of known configurations, and is configured to selectively establish a "decoupled state" in which torque of the first output shaft A2 is not distributed to the second output shaft A3 (that is, a power transmission system is formed only between the input shaft A1 and the first output shaft A2), and a "coupled state" in which torque of the first output shaft A2 is distributed to the second output shaft A3 (that is, a power transmission system is formed between the input shaft A1 and the first output shaft A2 and another power transmission system is formed between the input shaft A1 and the second output shaft A3).

Specifically, the multi-disc clutch mechanism C/T can adjust the maximum torque that can be distributed to the second output shaft A3 (hereinafter referred to as the "maximum transmittable torque T"). A state in which the maximum transmittable torque T is "0" corresponds to the "decoupled state," and a state in which the maximum transmittable torque T is greater than "0" corresponds to "the coupled state."

Figure 2:
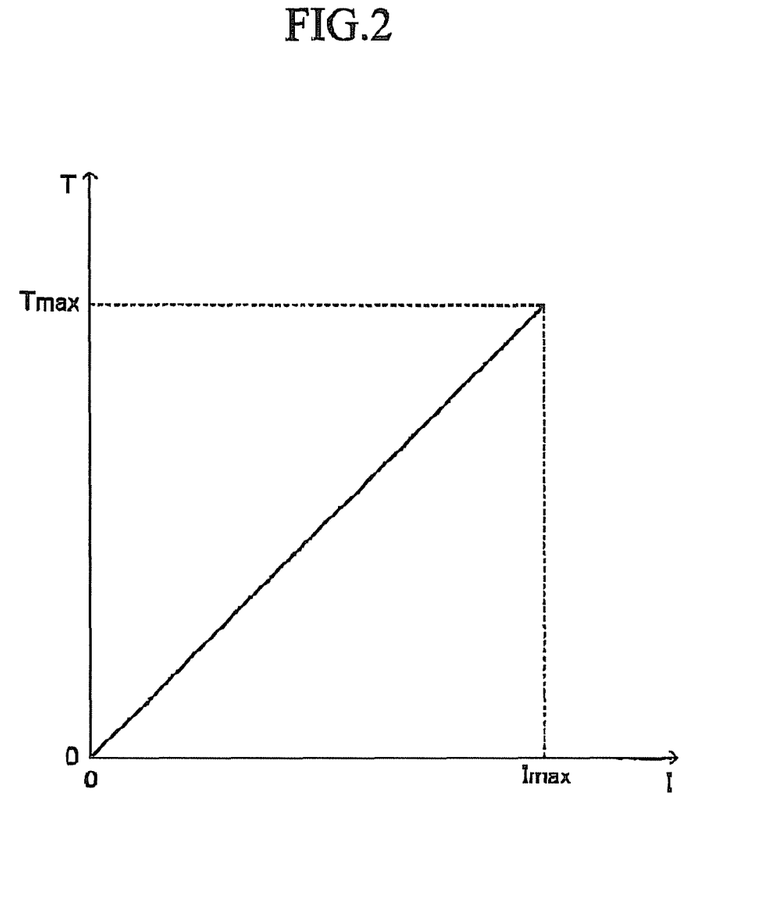
FIG. 2 is a graph showing the relation between clutch drive current and maximum transmittable torque of a multi-disc clutch mechanism shown in FIG. 1.

The maximum transmittable torque T can be adjusted through adjustment of current for driving an unillustrated actuator within the multi-disc clutch mechanism C/T (hereinafter referred to as "clutch drive current I"). Specifically, as shown in FIG. 2, the maximum transmittable torque T is adjusted such that it increases from "0" as the clutch drive current I increases from "0." When the clutch drive current I is the maximum valve Imax, the maximum transmittable torque T assumes the maximum value Tmax.

The rear-wheel-side differential D/Fr has one of known configurations, and distributes torque of the rear-wheel-side propeller shaft Arp to the left and right rear wheels via an axle Arr of the right rear wheel and an axle Arl of the left rear wheel. Similarly, the front-wheel-side differential D/Ff has one of known configurations, and distributes torque of the front-wheel-side propeller shaft Afp to the left and right front wheels via an axle Afr of the right front wheel and an axle Afl of the left front wheel.

The changeover mechanism M is disposed in the axle Afr of the right front wheel, and is configured to selectively establish a "connected state" in which a power transmission system is formed between the right front wheel and the front-wheel-side differential D/Ff, and a "disconnected state" in which no power transmission system is formed between the right front wheel and the front-wheel-side differential D/Ff. In the following description, a portion of the axle Afr of the right front wheel located between the changeover mechanism M and the right front wheel will be referred to as the "first axle Afr1": and a portion of the axle Afr of the right front wheel located between the changeover mechanism M and the front-wheel-side differential D/Ff will be referred to as the "second axle Afr2." This changeover mechanism M may be optionally equipped with a rotation synchronizing apparatus (synchronizer) for rendering the rotational speeds of the first and second axles Afr1 and Afr2 close to each other. Moreover, the changeover mechanism M may be disposed on the axle Afl of the left front wheel.

The changeover mechanism M has a configuration of, for example, a dog-type (a spline-engagement type). In this case, the changeover mechanism M includes, for example, a hub (outer spline or inner spline) united with one of the first and second axles Afr1 and Afr2, a sleeve (inner spline or outer spline) spline-engaged with the hub, a piece (outer spline or inner spline) united with the other of the first and second axles Afr1 and Afr2, and a fork for adjusting the position of the sleeve. When the sleeve is located in a first position, the piece and the sleeve spline-engage with each other, whereby the "connected state" is established. When the sleeve is located in a second position, the piece and the sleeve do not spline-engage with each other, whereby the "disconnected state" is obtained.

By virtue of the above-described configuration, when the multi-disc clutch mechanism C/T is in the "decoupled state" and the changeover mechanism M is in the "disconnected state," the drive system establishes the two-wheel drive state (the rear-wheel drive state); and, when the multi-disc clutch mechanism C/T is in the "coupled state" and the changeover mechanism M is in the "connected state," the drive system establishes the four-wheel drive state. In the following description, the two-wheel drive may also be referred to as "2WD," and the four-wheel drive may also be referred to as "4WD."

The wheel speed sensors Vfr, Vfl, Vrr, Vrl respectively detect the wheel speeds of the corresponding wheels. The longitudinal acceleration sensor Gx detects acceleration of the vehicle in the front and rear direction (longitudinal direction) thereof (longitudinal acceleration). The 2WD/4WD changeover switch S is configured to enable a driver of the vehicle to select a "2WD mode" or a "4WD mode" by operating the switch.

The electronic control apparatus ECU is a microcomputer having one of known configurations. The electronic control apparatus ECU controls the states of the engine E/G and the automatic transmission A/T in accordance with the state of the vehicle. Furthermore, the electronic control apparatus ECU controls an actuator (not shown) for controlling the state of the sub-transmission mechanism Z (the HIGH mode or the LOW mode) on the basis of the state (position) of an operation member (not shown) operated by the driver.

In addition, the electronic control apparatus ECU controls an actuator (not shown) for controlling the state (maximum transmittable torque T) of the multi-disc clutch mechanism C/T and an actuator (not shown) for controlling the state (the "connected state" or the "disconnected state") of the changeover mechanism M in accordance with the rotational speeds of the four wheels, the state of the 2WD/4WD changeover switch S, etc.

Specifically, in the case where the 2WD/4WD changeover switch S is set to the "2WD mode," the drive system is always maintained in the two-wheel drive state. Meanwhile, in the case where the 2WD/4WD changeover switch S is set to the "4WD mode," the drive system is usually maintained in the two-wheel drive state, and is switched from the two-wheel drive state to the four-wheel drive state only when slippage in an acceleration direction (acceleration slippage) occurs at any of the left and right rear wheels. After the drive system is switched to the four-wheel drive state, as will be described later, the drive system is returned from the four-wheel drive state to the two-wheel drive state. As described above, the present apparatus is a so-called on-demand-type apparatus.

In the present example, the four wheels are assumed to have the same outer diameter. Accordingly, when the vehicle is traveling in the four-wheel drive state (in particular, when the vehicle is traveling straight and the four wheels have no slippage), the rotational speeds of the front-wheel-side and rear-wheel-side propeller shafts Afp and Arp become equal to each other. Meanwhile, when the vehicle is traveling in the two-wheel drive state (In particular, when the vehicle is traveling straight and the four wheels have no slippage), the rotation of the front-wheel-side propeller shaft Afp stops (substantially). That is, idle rotation of the front-wheel-side propeller shaft Afp is prevented (restrained). This phenomenon occurs because of the "decoupled state" of the multi-disc clutch mechanism C/T, the "disconnected state" of the changeover mechanism M, and the action of the front-wheel-side differential D/Ff. As a result, in the two-wheel drive state, drive energy required for idle rotation of the front-wheel-side propeller shaft Afp becomes unnecessary, whereby fuel efficiency is improved.

(Operation of Changeover from 2WD to 4WD)

Figure 3:
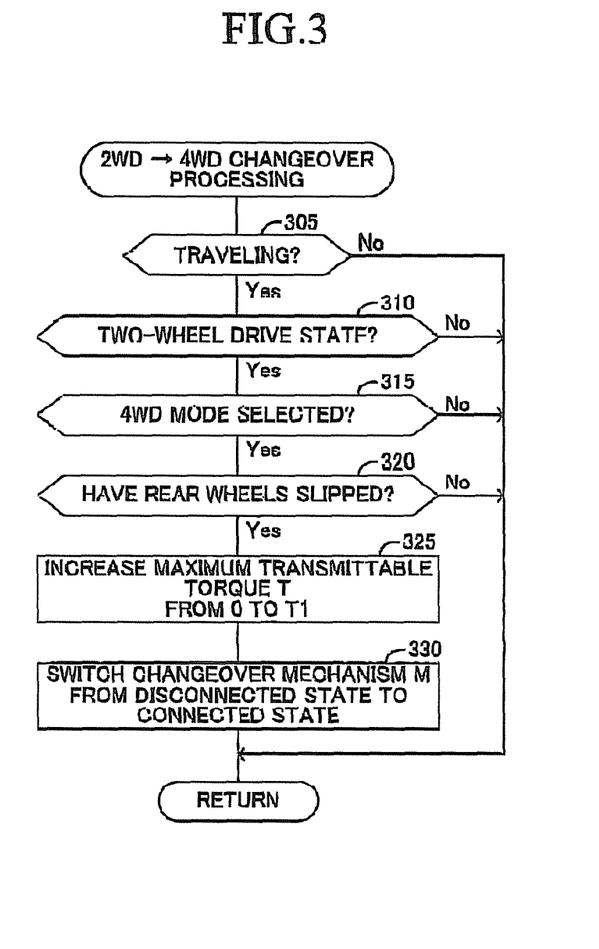
FIG. 3 is a flowchart showing a routine for performing processing for changeover from two-wheel drive to four-wheel drive, which routine is executed by an ECU shown in FIG. 1.

Next, with reference to a flowchart shown in FIG. 3, operation of the drive system having the above-described configuration will be described for the case where the drive system is in the two-wheel drive state (the multi-disc clutch mechanism C/T is in the "decoupled state" (the maximum transmittable torque T=0) and the changeover mechanism M is in the "disconnected state"), and the drive system is switched from the two-wheel drive state to the four-wheel drive state. The routine of FIG. 3 is stored in ROM within the electronic control apparatus ECU, and is started and executed by a CPU within the electronic control apparatus ECU at predetermined intervals (e.g., 6 msec).

In step 305, the CPU determines whether or not the vehicle is traveling. In step 310, the CPU determines whether or not the drive system is in the two-wheel drive state. In step 315, the CPU determines whether or not the "4WD mode" is selected. In step 320, the CPU determines whether or not acceleration slippage occurs at the left and right rear wheels.

The determination in step 305 as to whether or not the vehicle is traveling is made by means of, for example, determining whether or not an "estimated vehicle speed obtained from an integrated value of the longitudinal acceleration of the vehicle is equal to or greater than a predetermined very small value." The determination in step 320 as to whether or not acceleration slippage occurs at the left and right rear wheels is made by means of, for example, determining whether or not the "averaged wheel speed is greater than the estimated vehicle speed obtained from the integrated value of the longitudinal acceleration of the vehicle, and the difference therebetween is equal to or greater than a predetermined value."

In the case where the CPU makes a "No" determination in any of steps 305, 310, 315, and 320, the CPU ends the present routine immediately. Meanwhile, in the case where the CPU makes a "Yes" determination in all the steps 305, 310, 315, and 320, the CPU executes the processing of step 325 and steps subsequent thereto.

In step 325, the CPU increases the maximum transmittable torque T of the multi-disc clutch mechanism C/T from "0" toward a predetermined value T1 (0<T1<Tmax). As a result, the multi-disc clutch mechanism C/T is switched from the "decoupled state" to the "coupled state." The predetermined value T1 may be determined on the basis of the degree of slippage of wheels, the vehicle speed, etc. In step 330, the CPU switches the changeover mechanism M from the "disconnected state" to the "connected state." Notably, when the changeover mechanism M is switched from the "disconnected state" to the "connected state," it is necessary to restrain acceleration slippages of the left and right rear wheels, to thereby secure a state in which the rotational speeds of the first and second axles Afr1 and Afr2 become (substantially) equal to each other. Therefore, if necessary, processing for decreasing the drive torques of the left and right rear wheels (hereinafter referred to as "torque decreasing processing") is executed. Examples of this torque decreasing processing include processing of reducing the output of the engine E/G, and processing of forcedly imparting braking torques to the left and right rear wheels.

By virtue of the above-described operation, in the case where the vehicle is traveling, the drive system is in the two-wheel drive state, the 4WD mode" is selected, and the left and right rear wheels causes acceleration slippages, the drive system is switched from the two-wheel drive state to the four-wheel drive state. As a result, the drive torque distributed to the left and right front wheels increases (from "0"), and the drive torque distributed to the left and right rear wheels decreases.

(Operation of Changeover from 4WD to 2WD)

Figure 4:
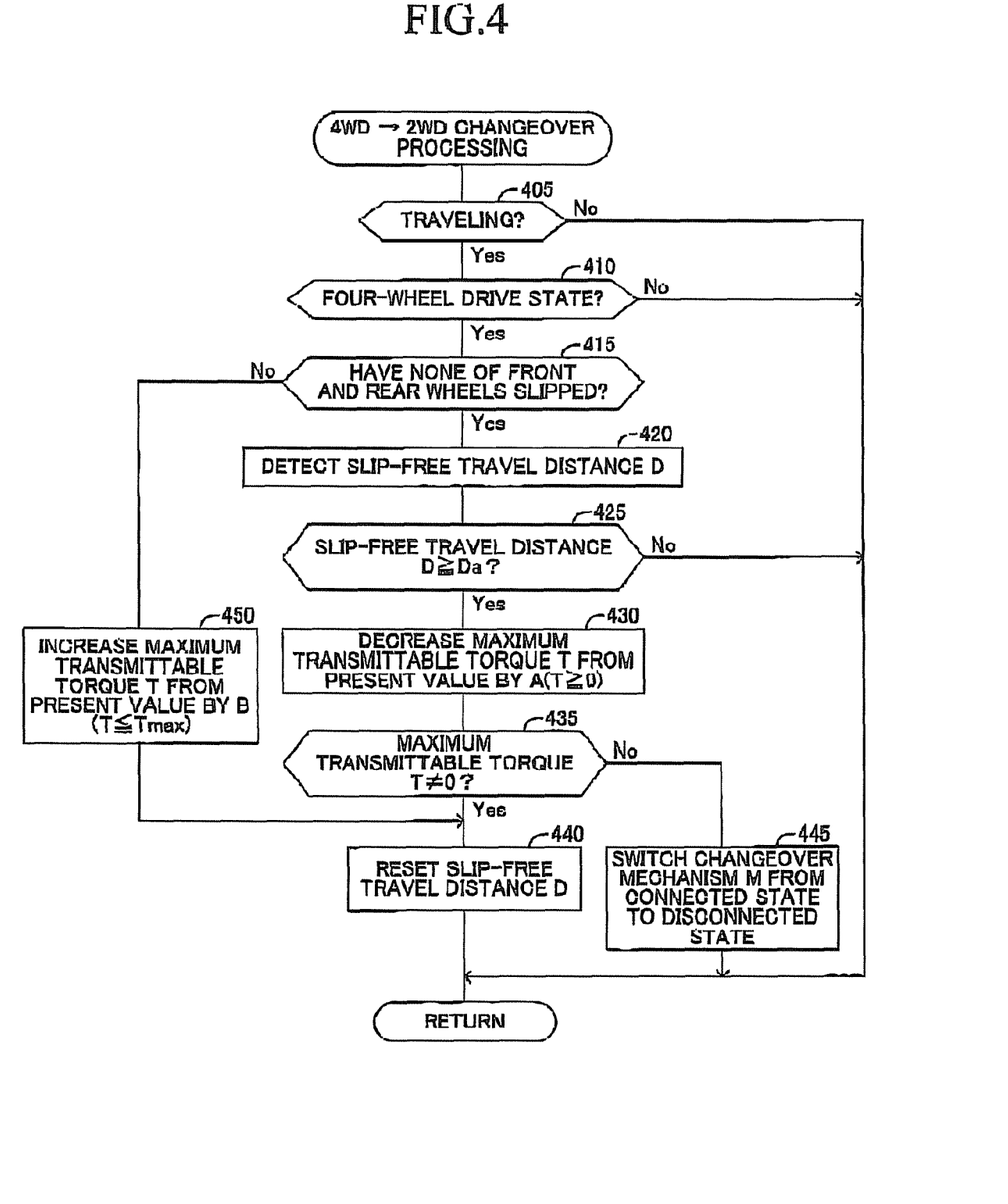
FIG. 4 is a flowchart showing a routine for performing processing for changeover from four-wheel drive to two-wheel drive, which routine is executed by the ECU shown in FIG. 1.

Next, with reference to a flowchart shown in FIG. 4, operation of the drive system having the above-described configuration will be described for the case where the drive system is in the four-wheel drive state (the multi-disc clutch mechanism C/T is in the "coupled state" (the maximum transmittable torque T=T1>0) and the changeover mechanism M is in the "connected state"), and the drive system is switched from the four-wheel drive state to the two-wheel drive state. The routine of FIG. 4 is stored in the ROM within the electronic control apparatus ECU, and is started and executed by the CPU within the electronic control apparatus ECU at predetermined intervals (e.g., 6 msec).

In step 405, the CPU determines whether or not the vehicle is traveling. In step 410, the CPU determines whether or not the drive system is in the four-wheel drive state. In the case where the CPU makes a "No" determination in step 405 or step 410, the CPU ends the present routine immediately. Meanwhile, in the case where the CPU makes a "Yes" determination in both the steps 405 and 410, the CPU executes the processing of step 415 and stops subsequent thereto.

In step 415, the CPU determines whether or not none of the left and right rear wheels and the left and right front wheels cause acceleration slippage. The case where the CPU makes a "No" determination in step 415 will be described later. In the case where the CPU makes a "Yes" determination in step 415, in step 420, the CPU detects a slip-free travel distance D, and then executes the processing of step 425 and steps subsequent thereto.

The slip-free travel distance D is a travel distance of the vehicle which is reset to "0" every time step 440 to be described later is executed. Accordingly, the slip-free travel distance D is reset every time the CPU makes a "No" determination in step 415; i.e., every time acceleration slip occurs at any of the wheels. The travel distance of the vehicle may be calculated and updated, for example, by integrating the longitudinal acceleration of the vehicle two times.

In step 425, the CPU determines whether or not the slip-free travel distance D reaches a predetermined distance Da. When the CPU makes a "No" determination, the CPU ends the present routine immediately. Meanwhile, in the case where the CPU makes a "Yes" determination, in step 430, the CPU decreases the maximum transmittable torque T of the multi-disc clutch mechanism C/T from the present value by a predetermined value A (>0). However, in the case where the maximum transmittable torque T becomes negative, the maximum transmittable torque T is set to 0. Notably, the predetermined value A may be set to a value smaller than the lower limit value of the range of the maximum transmittable torque T that may be set in the "coupled state" (i.e., the range of T1).

In step 436, the CPU determines whether or not the maximum transmittable torque T is "non-0." In the case where the CPU makes a "Yes" determination (that is, T>0; "coupled state"), in step 440, the CPU resets the slip-free travel distance D. Meanwhile, in the case where the CPU makes a "No" determination (T=0; "decoupled state"), in step 445, the CPU switches the changeover mechanism M from the "connected state" to the "disconnected state."

By virtue of the above-described operation, in the case where the vehicle is traveling and the drive system is in the four-wheel drive state, the maximum transmittable torque T decrease stepwise from the present value by a predetermined value A every time the vehicle travels over the predetermined distance Da in a state in which none of the wheels cause acceleration slippage. When the maximum transmittable torque T reaches "0" (that is, the multi-disc clutch mechanism C/T is switched from the "coupled state" to the "decoupled state"), the changeover mechanism M is switched from the "connected state" to the "disconnected state," As a result, the drive system is switched from the four-wheel drive state to the two-wheel drive state. With this operation, the drive torque distributed to the left and right front wheels decreased (to "0"), and the drive torque distributed to the left and right rear wheels increases.

Next, there will be descried the case where the CPU makes a "No" determination in step 415; that is, the case where any of the wheels has caused acceleration slip in a state in which the vehicle is traveling and the drive system is in the four-wheel drive state. In such a case, in step 450, the CPU increases the maximum transmittable torque T of the multi-disc clutch mechanism C/T from the present value by a predetermined value B (>0). In step 440 subsequent thereto, the CPU resets the slip-free travel distance D. In the case where the maximum transmittable torque T exceeds Tmax, the maximum transmittable torque T is set to Tmax. Notably, the predetermined value B may be set to a value smaller than the lower limit value of the range of the maximum transmittable torque T that may be set in the "coupled state" (i.e., the range of T1).

(Operation Example)

Figure 5:
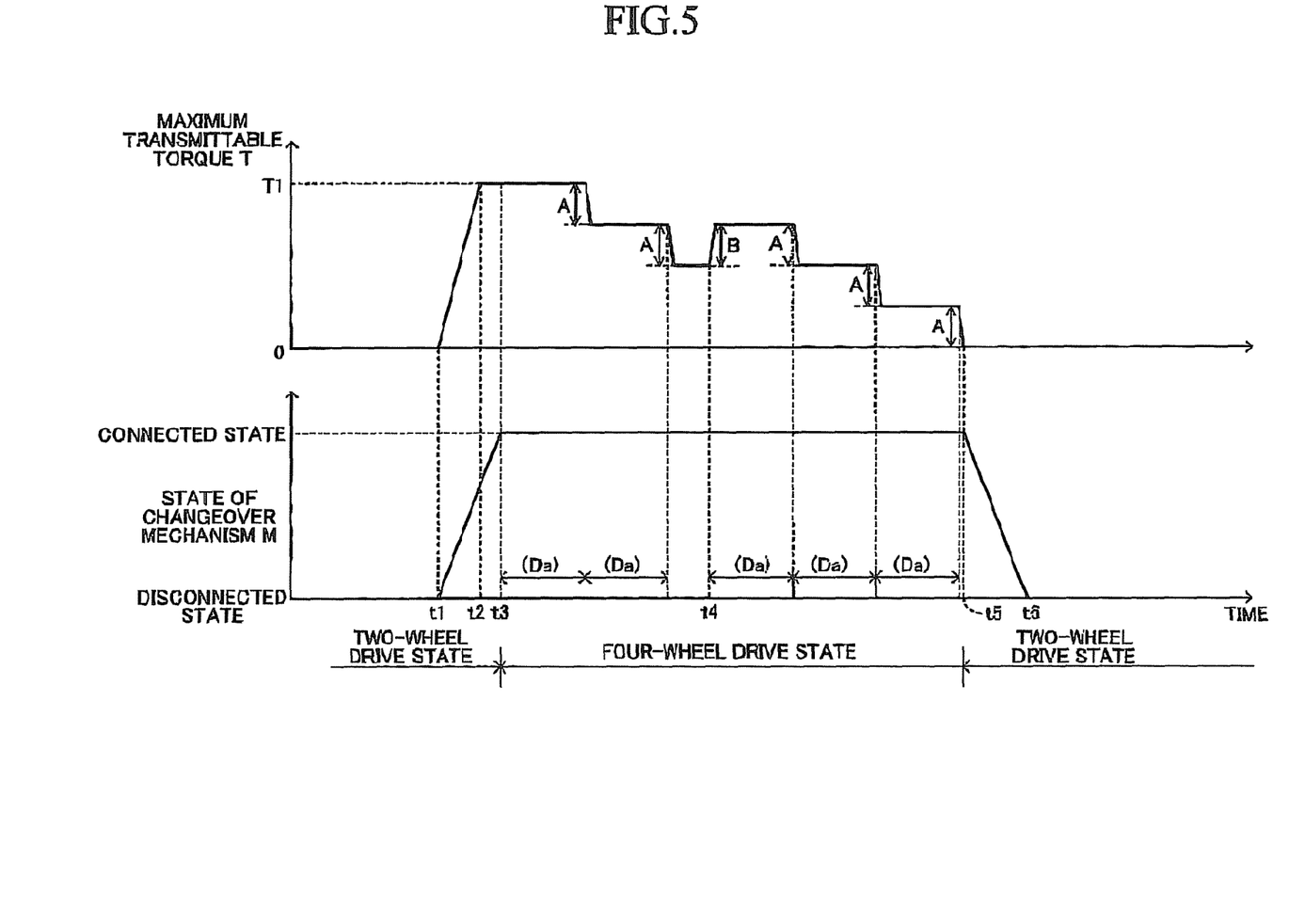
FIG. 5 is a time chart showing an example of the case where changeover operation from two-wheel drive to four-wheel drive and changeover operation from four-wheel drive to two-wheel drive are performed in accordance with the routines shown in FIGS. 3 and 4.

FIG. 5 shows example changes in the maximum transmittable torque T of the multi-disc clutch mechanism C/T and the state of the changeover mechanism M for the case where the state of the drive system changes from the two-wheel drive state to the four-wheel drive state, and then to the two-wheel drive state as a result of execution of the routines shown in FIGS. 3 and 4.

In the example shown in FIG. 5, before time t1, the 2WD/4WD changeover switch S is set to the "4WD mode," and the vehicle is traveling in the two-wheel drive state (in the rear-wheel-drive state; i.e., in a state in which the maximum transmittable torque T is "0" and the changeover mechanism M is in the "disconnected state"). At time t1, the rear wheels start to cause acceleration slippages in the two-wheel drive state.

In this case, at time t1, the CPU makes a "Yes" determination in all the steps 305, 310, 315 and 320 of FIG. 3. The CPU thus executes the processing of steps 325 and 330. As a result, immediately after time t1, operation for switching from the two-wheel drive state to the four-wheel drive state is started.

Specifically, after time t1, the CPU executes an operation of increasing the maximum transmittable torque T from "0" toward the predetermined value T1 and switching the changeover mechanism M from the "disconnected state" to the "connected state" (hereinafter called the "connecting operation"). After the maximum transmittable torque T has reached the predetermined value T1 at time t2, the connecting operation of the changeover mechanism M is completed at time t3. As a result, at time t3, the drive system is switched from the two-wheel drive state to the four-wheel drive state.

The timing at which the connecting operation of the changeover mechanism M is completed is set "to be delayed from the time when the "maximum transmittable torque T reaches the predetermined value T1 because of the following reason. That is, before the maximum transmittable torque T reaches the predetermined value T1, the rotational speed difference between the first and second axles Afr1 and Afr2 may be relatively large because the rotational speed of the front-wheel-side propeller shaft Afp is still low. Accordingly, in such a state, the connecting operation of the changeover mechanism M cannot be performed smoothly (a shock is likely to be generated in the vehicle). In contrast, after the maximum transmittable torque T has reached the predetermined value T1, the rotational speed difference between the first and second axles Afr1 and Afr2 may be relatively small, because the rotational speed of the front-wheel-side propeller shaft Afp coincides with the rotational speed of the rear-wheel-side propeller shaft Arp, and acceleration slippages of the left and right rear wheels are restrained by the above-described torque decreasing processing. That is, in the case where the timing at which the connecting operation of the changeover mechanism M is completed is set "to be delayed from the time when the maximum transmittable torque T reaches the predetermined value T1," the connecting operation of the changeover mechanism M can be performed smoothly.

In this example, as a result of switching from the two-wheel drive state to the four-wheel drive state at time t3 (that is, an increase in the drive torque distributed to the left and right front wheels and a decrease in the drive torque distributed to the left and right rear wheels), acceleration slippages of the rear wheels disappear, and, after time t3, a state in which the wheels do not cause acceleration slippage continues for a while. Accordingly, after time t3, the CPU makes a "Yes" determination every time it executes step 415 of FIG. 4. As a result, after time t3, every time the vehicle travels over the predetermined distance Da, the CPU makes a "Yes" determination in step 425, and decreases the maximum transmittable torque T stepwise from the present value by the predetermined value A (step 430). In other words, the drive torque distributed to the left and right front wheels decreases stepwise, and the drive torque distributed to the left and right rear wheels increases stepwise.

In this example, after time t3, the maximum transmittable torque T decreases stepwise two times. Subsequently, at time t4, which is before the travel distance of the vehicle reaches the predetermined distance Da after the maximum transmittable torque T has decreased two times, the wheels (specifically, the rear wheels whose drive torque has increased) again caused acceleration slippages. As a result, at time t4, the CPU makes a "No" determination in step 415, and increases the maximum transmittable torque T from the present value by the predetermined value B (step 450). In other words, the drive torque distributed to the left and right front wheels increases stepwise, and the drive torque distributed to the left and right rear wheels decreases stepwise.

In this example, as a result of an increase in the maximum transmittable torque T at time t4, slippages of the wheels (specifically, the rear wheels whose drive torque has decreased) disappear, and, after time t4, a state in which the wheels do not cause acceleration slippage continues. As a result, after time t4, every time the vehicle travels over the predetermined distance Da, the CPU makes a "Yes" determination in step 425, and decreases the maximum transmittable torque T stepwise from the present value by the predetermined value A (step 430).

In this example, after time t4, the maximum transmittable torque T decreases stepwise three times, and, at time t5, the maximum transmittable torque reaches "0." As a result, at time t5, the CPU makes a "No" determination in step 435, and, after time t5, the CPU executes an operation of switching the changeover mechanism M from the "connected state" to the "disconnected state" (hereinafter called the "disconnecting operation"). As a result, at time t5, the drive system is switched from the four-wheel drive state to the two-wheel drive state. The disconnecting operation of the changeover mechanism M is completed at time t6.

(Action and Effects)

In the present apparatus (on-demand-type apparatus) according to the embodiment of the present invention which has been described above, when drive wheels (left and right rear wheels) cause acceleration slippage in the two-wheel drive state, the drive system is switched from the two-wheel drive state to the four-wheel drive state. That is, the maximum transmittable torque T of the multi-disc clutch mechanism C/T increases from "0" to the predetermined value T1. In the four-wheel drive state, every time the vehicle travels over the predetermined distance Da in a state in which none of the wheels cause acceleration slippage, the maximum transmittable torque T decreases stepwise from the present value by the predetermined value A (>0). That is, the clutch drive current I supplied to the multi-disc clutch mechanism C/T also decreases gradually (stepwise in a plurality of steps).

Accordingly, as compared with the first conventional example described in the "SUMMARY OF THE PRESENT INVENTION" section, wasteful consumption of the clutch drive current supplied to the multi-disc clutch mechanism C/T can be restrained. In addition, as the maximum transmittable torque T decreases gradually (stepwise in a plurality of steps), the drive torque transmitted to the left and right rear wheels (drive wheels in the two-wheel drive state) increases gradually (stepwise in a plurality of steps). Accordingly, as compared with the second conventional example described in the "SUMMARY OF THE PRESENT INVENTION" section, the left and right rear wheels hardly cause large acceleration slippage.

According to the present apparatus described above, when the drive system is switched from the four-wheel drive state to the two-wheel drive state, wasteful consumption of the clutch drive current I is restrained, and occurrence of large acceleration slippages at the wheels can be restrained.

In addition, in the present apparatus, when any of the left and right rear wheels causes acceleration slippage in the four-wheel drive state, the maximum transmittable torque T is increased from the present value by the predetermined value B (>0). As a result, whereas the drive torque transmitted to the left and right front wheels increases, the drive torque transmitted to the left and right rear wheels decreases. In other words, the proportions of the drive torques transmitted to the four wheels are changed such that the proportions become more uniform. Thus, in the case where the vehicle is in an instable state in which acceleration slippage occurs at one of the wheels, occurrence of acceleration slippage is restrained, and the vehicle can be placed in a more stable state.

The present invention is not limited to the above-described embodiment, and various modifications may be employed within the scope of the present invention. For example, in the above-described embodiment, rear-wheel drive is employed as the two-wheel drive. However, front-wheel drive may be employed as the two-wheel drive. In this case, the first output shaft A2 of the transfer T/F is connected to the front-wheel-side propeller shaft Afp, the second output shaft A3 of the transfer T/F is connected to the rear-wheel-side, propeller shaft Afp, and the changeover mechanism M is interposed in one of the axles Arl and Arr of the left and right rear wheels.

In the above-described embodiment, the transfer T/F includes the sub-transmission mechanism Z provided therein. However, the sub-transmission mechanism Z may be omitted. Also, in the above-described embodiment, the changeover mechanism M may be omitted. In this case, the drive system is switched from the two-wheel drive state to the four-wheel drive state only through switching of the multi-disc clutch mechanism C/T from the "decoupled state" to the "coupled state" (that is, through switching of the maximum transmittable torque T from "0" to a value greater than "0"). Similarly, the drive system is switched from the four-wheel drive state to the two-wheel drive state only through switching of the multi-disc clutch mechanism C/T from the "coupled state" to the "decoupled state" (that is, through switching of the maximum transmittable torque T to "0" from a value greater than "0").

In the above-described embodiment, a state in which the maximum transmittable torque T is "0" corresponds to the "decoupled state"; and a state in which the maximum transmittable torque T is greater than "0" corresponds to the "coupled state." However, a state in which the maximum transmittable torque T is equal to or less than a very small value greater than "0" may correspond to the "decoupled state"; and a state in which the maximum transmittable torque T is greater than the very small value may correspond to the "coupled state."

In the above-described embodiment, when any of the left and right rear wheels causes acceleration slippage in the four-wheel drive state, the maximum transmittable torque T is increased from the present value by the predetermined value B. However, the maximum transmittable torque T may be maintained at the present value even when any of the left and right rear wheels causes acceleration slippage.

Figure 6:
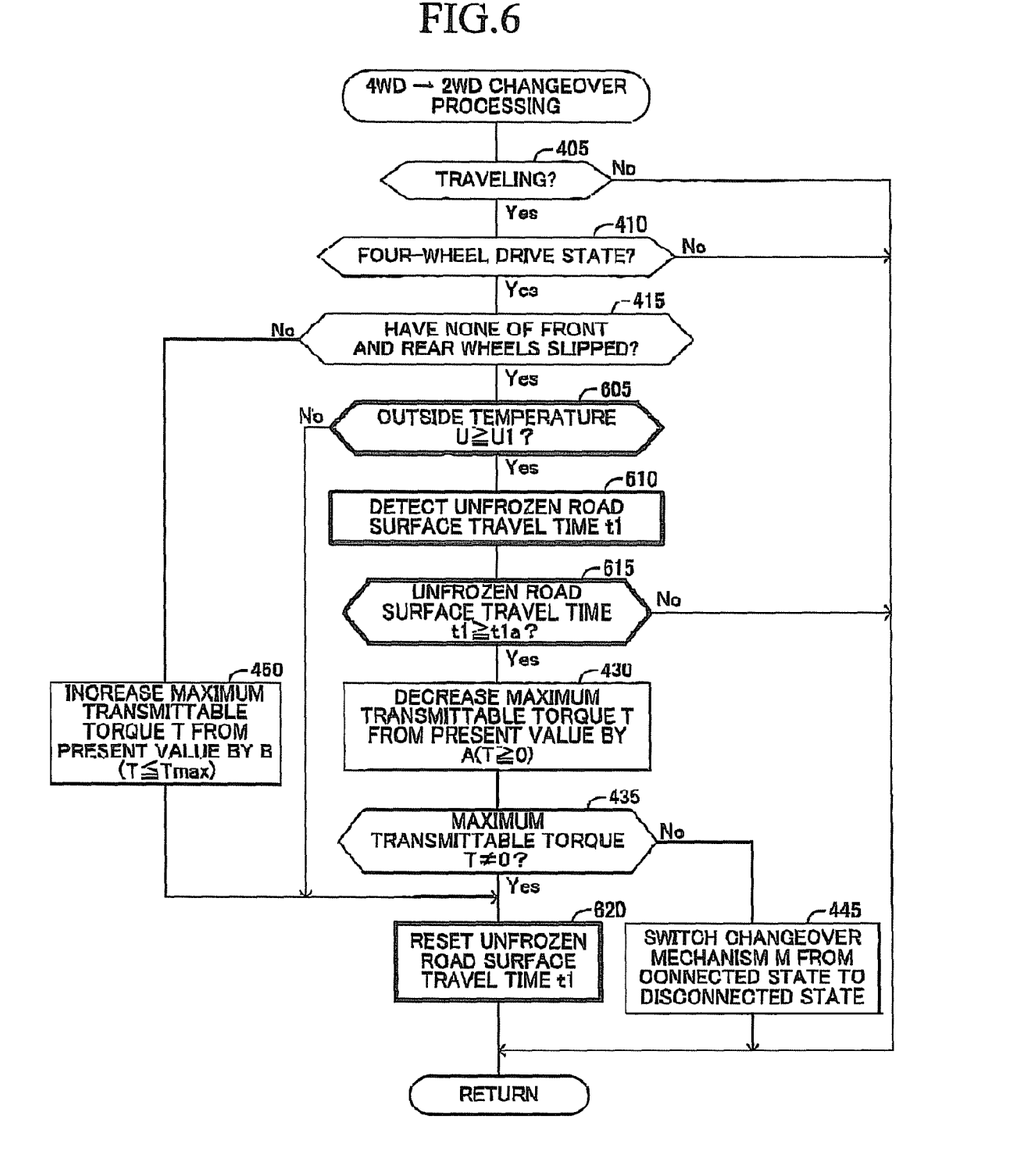
FIG. 6 is a flowchart showing a routine for performing processing for changeover from four-wheel drive to two-wheel drive, which routine is executed by an ECU of a drive state control apparatus according to a modification of the embodiment of the present invention.

In the case where the vehicle includes means for detecting the temperature outside the vehicle, the above-described embodiment may be configured to decrease the maximum transmittable torque T stepwise from the present value by the predetermined value A (>0) every time a state in which the detected outside temperature U is equal to or higher than a predetermined temperature U1 continues for a predetermined time.

In this case, a flowchart shown in FIG. 6 is employed in place of the flowchart shown in FIG. 4. In FIG. 6, steps identical with the steps shown in FIG. 4 are denoted by the same step numbers as those used in FIG. 4, and steps different from those of FIG. 4 are illustrated by use of thick frames (the same also applies to FIGS. 7 and 8 to be described later). Specifically, in FIG. 6, the step 420 of FIG. 4 is replaced with steps 605 and 610, the step 425 of FIG. 4 is replaced with step 615, and the step 440 of FIG. 4 is replaced with step 620. Detailed description of FIG. 6 will be omitted.

Figure 7:
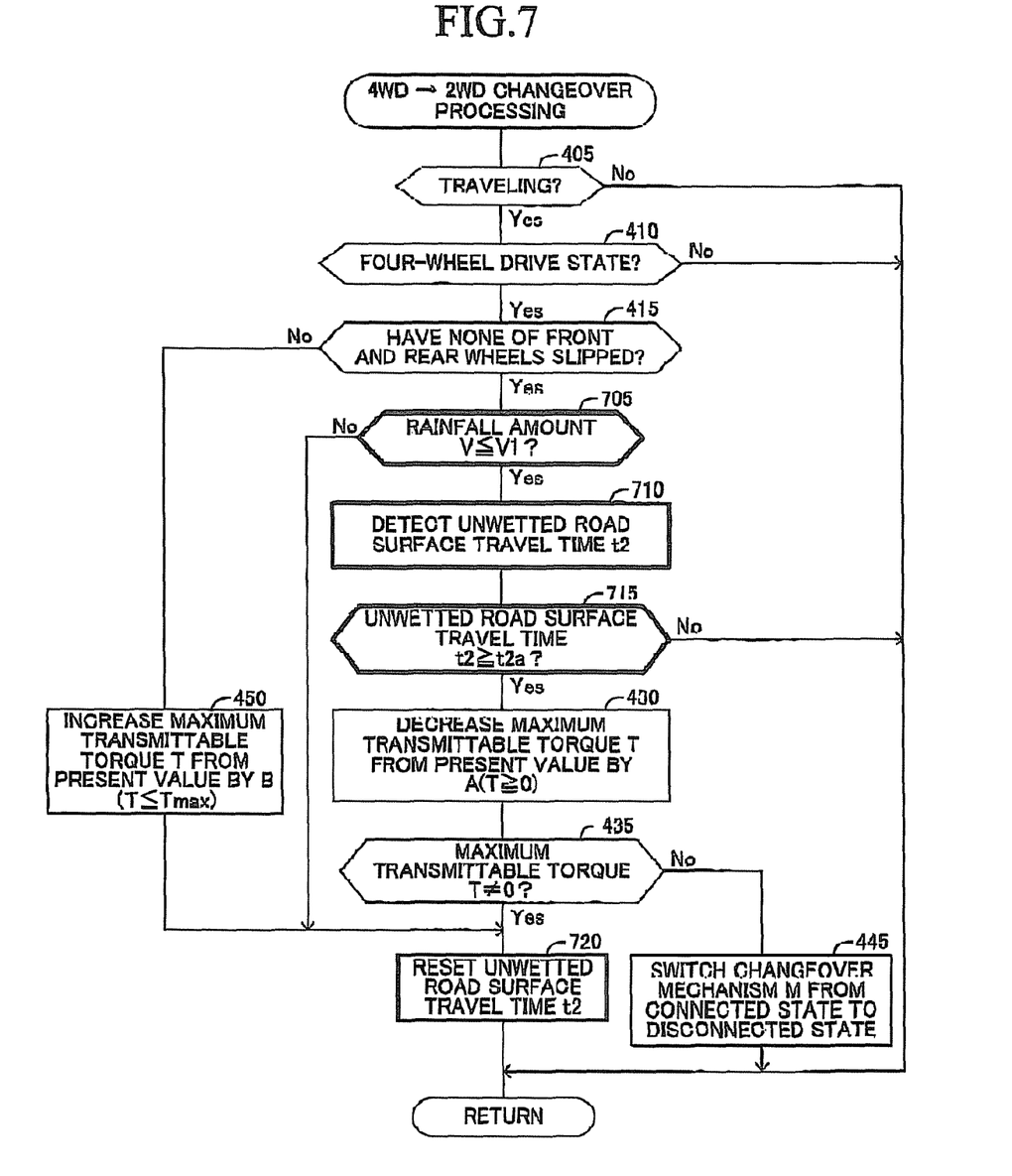
FIG. 7 is a flowchart showing a routine for performing processing for changeover from four-wheel drive to two-wheel drive, which routine is executed by an ECU of a drive state control apparatus according to another modification of the embodiment of the present invention.

In the case where the vehicle includes means for detecting the amount of rainfall, the above-described embodiment may be configured to decrease the maximum transmittable torque T stepwise from the present value by the predetermined value A (>0) every time a state in which the detected rainfall amount V is equal to or less than a predetermined rainfall amount V1 continues for a predetermined time.

In this case, a flowchart shown in FIG. 7 is employed in place of the flowchart shown in FIG. 4. Specifically, in FIG. 7, the step 420 of FIG. 4 is replaced with steps 705 and 710, the step 425 of FIG. 4 is replaced with step 715, and the step 440 of FIG. 4 is replaced with step 720. Detailed description of FIG. 7 will be omitted.

Figure 8:
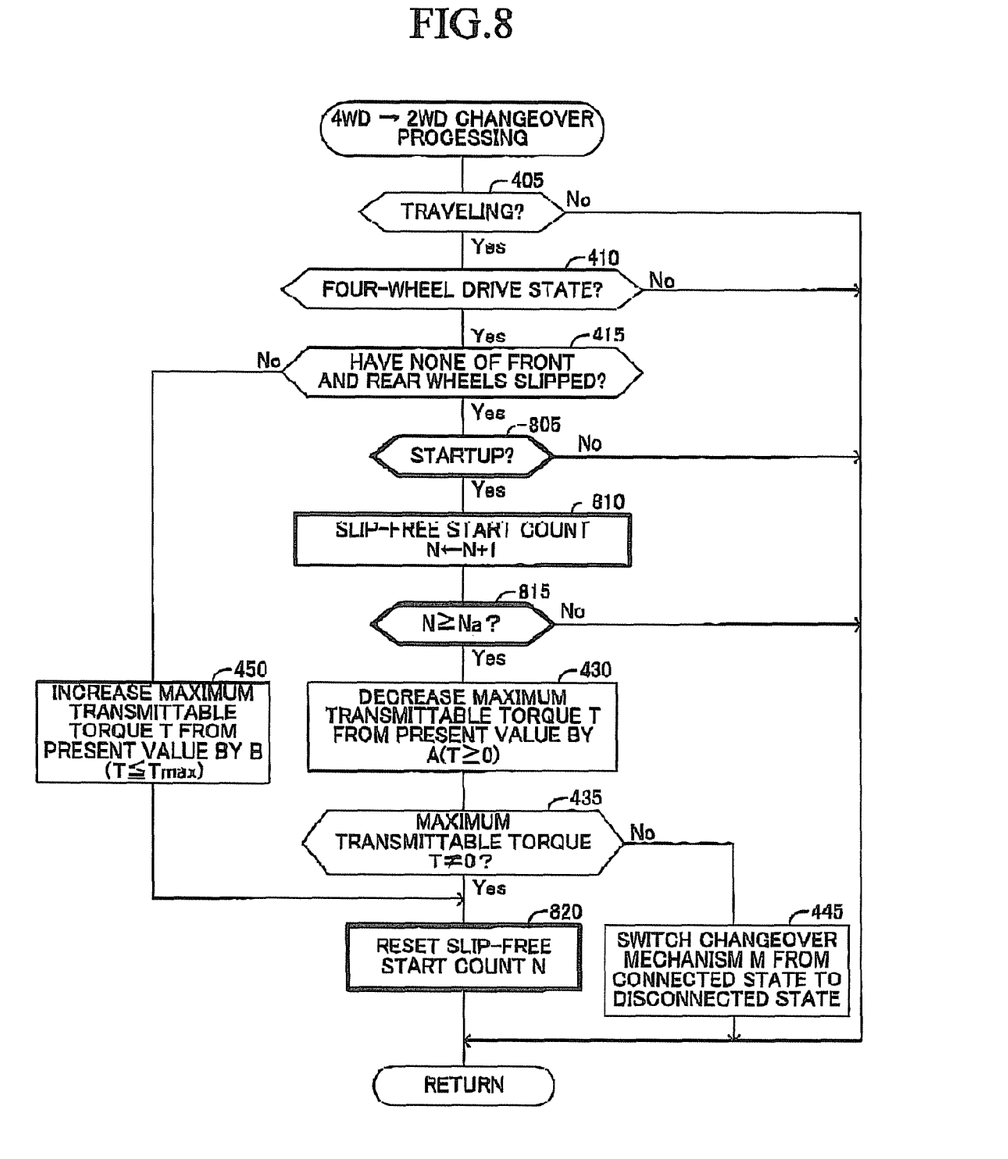
FIG. 8 is a flowchart showing a routine for performing processing for changeover from four-wheel drive to two-wheel drive, which routine is executed by an ECU of a drive state control apparatus according to still another modification of the embodiment of the present invention.

The above-described embodiment may be configured to decrease the maximum transmittable torque T stepwise from the present value by the predetermined value A (>0) every time a state in which the wheels are determined to have caused no acceleration slippage at the time of start of the vehicle continuously occurs a predetermined number of times. The "start of the vehicle" is detected by means of, for example, detecting that the estimated vehicle speed obtained from the integrated value of the longitudinal acceleration of the vehicle has changed from a value not greater than a very small value to a value greater than the very small value.

In this case, a flowchart shown in FIG. 8 is employed in place of the flowchart shown in FIG. 4. Specifically, in FIG. 8, the step 420 of FIG. 4 is replaced with steps 805 and 810, the step 425 of FIG. 4 is replaced with step 815, and the step 440 of FIG. 4 is replaced with step 820. Detailed description of FIG. 8 will be omitted.

In the above-described embodiment, there is assumed the case where the vehicle stops in the state in which the multi-disc clutch mechanism C/T is in the "coupled state" (the maximum transmittable torque T>0), and the vehicle starts after that time. In this case, while the vehicle stops, the maximum transmittable torque T is maintained at "0." Subsequently, when the vehicle starts, the maximum transmittable torque T may be set to a value which is obtained by subtracting, from the value at the time of previous start of the vehicle, a "total decrease amount increased on the basis of the predetermined value A in a period between the previous start of the vehicle to present stoppage of the vehicle," and adding, to the value at the time of the previous start of the vehicle, a "total increase amount increased on the basis of the predetermined value B in a period between the previous start of the vehicle to the present stoppage."

What is claimed is:

1. A drive state control apparatus for a vehicle comprising:
a transfer (T/F) which includes an input shaft (A1) connected to an output shaft of a transmission (A/T) connected to a power source (E/G) of a vehicle, a first output shaft (A2) connected to first left and right wheels which are left and right front wheels or left and right rear wheels, a second output shaft (A3) connected to second left and right wheels which are remaining left and right wheels, and a clutch mechanism (C/T) which selectively establishes a decoupled state in which a power transmission system is formed only between the input shaft and the first output shaft and a coupled state in which power transmission systems are formed between the input shaft and the first and second output shafts, the clutch mechanism (C/T) being capable of adjusting a maximum transmittable torque, which is the maximum torque transmittable to the second output shaft in the coupled state;
slippage determination means (Vfr, Vfl, Vrr, Vrl, Gx, ECU) for determining whether or not slippage occurs at the first and second left and right wheels; and
control means (ECU) for switching the clutch mechanism from the decoupled state to the coupled state when at least one of the first left and right wheels is determined to have caused slippage in a state in which the clutch mechanism is in the decoupled state, wherein
the control means is configured such that, when the vehicle is traveling and the clutch mechanism is in the coupled state, the control means executes an operation plural times in which operation the maximum transmittable torque is decreased from a present value by a first predetermined amount every time a predetermined condition is satisfied, and wherein in the case where the vehicle stops in a state in which the clutch mechanism is in the coupled state and the vehicle starts after that time, the control means maintains the maximum transmittable torque to be zero while the vehicle stops, and when the vehicle starts, the control means sets the maximum transmittable torque to a value which is obtained by subtracting, from a value of the maximum transmittable torque at the time of a previous start of the vehicle, a total decrease amount increased on a basis of the first predetermined amount in a period between the previous start of the vehicle and a present stoppage of the vehicle.

2. The drive state control apparatus for a vehicle according to claim 1, wherein the predetermined condition is such that a state in which the first and second left and right wheels are determined to have no slippage continues while the vehicle travels over a predetermined distance.

3. The drive state control apparatus for a vehicle according to claim 1, further comprising temperature detection means for detecting temperature outside the vehicle, wherein the predetermined condition is such that a state in which the detected outside temperature is equal to or higher than a predetermined temperature continues for a predetermined time.

4. The drive state control apparatus for a vehicle according to claim 1, further comprising rainfall amount detection means for detecting an amount of rainfall, wherein the predetermined condition is such that a state in which the detected rainfall amount is equal to or less than a predetermined amount continues for a predetermined time.

5. The drive state control apparatus for a vehicle according to claim 1, wherein the predetermined condition is such that a state in which the first and second left and right wheels are determined to have no slippage at the time of start of the vehicle occurs a predetermined number of times continuously.

6. The drive state control apparatus for a vehicle according to claim 1, wherein the control means is configured to increase the maximum transmittable torque from the present value by a second predetermined amount when at least one of the first left and right wheels is determined to have caused slippage in a state in which the clutch mechanism is in the coupled state.

7. The drive state control apparatus for a vehicle according to claim 6, wherein the control means adds to the value at the time of previous start of the vehicle, a total increase amount increased on the basis of the second predetermined value in a period between the previous start of the vehicle and the present stoppage of the vehicle.

8. The drive state control apparatus for a vehicle according to claim 1, further comprising a changeover mechanism (M) disposed in an axle (Afr) of a specific wheel, which is one of the second left and right wheels, and adapted to selectively establish a connected state in which a power transmission system is formed between the specific wheel and a differential (D/Ff) disposed between axles (Afr, Afl) of the second left and right wheels, and a disconnected state in which no power transmission system is formed between the differential and the specific wheel, wherein the control means switches the changeover mechanism (M) from the disconnected state to the connected state when the clutch mechanism is switched from the decoupled state to the coupled state; and the control means switches the changeover mechanism (M) from the connected state to the disconnected state when the clutch mechanism is switched from the coupled state to the decoupled state as a result of the maximum transmittable torque being decreased a number of times by the first predetermined amount for each time in a state in which the clutch mechanism is in the coupled state and the changeover mechanism is in the connected state.

9. A drive state control apparatus for a vehicle comprising:

a transfer (T/F) which includes an input shall (A1) connected to an output shaft of a transmission (A/T) connected to a power source (E/G) of a vehicle, a first output shaft (A2) connected to first left and right wheels which are left and right front wheels or left and right rear wheels, a second output shaft (A3) connected to second left and right wheels which are remaining left and right wheels, and a clutch mechanism (C/T) which selectively establishes a decoupled state in which a power transmission system is formed only between the input shaft and the first output shaft and a coupled state in which power transmission systems are formed between the input shaft and the first and second output shafts, the clutch mechanism (C/T) being capable of adjusting a maximum transmittable torque, which is the maximum torque transmittable to the second output shaft in the coupled state;

slippage determination means (Vfr, Vfl, Vrr, Vrl, Gx, ECU) for determining whether or not slippage occurs at the first and second left and right wheels; and control means (ECU) for switching the clutch mechanism from the decoupled state to the coupled state when at least one of the first left and right wheels is determined to have caused slippage in a state in which the clutch mechanism is in the decoupled state, wherein the control means is configured such that, when the vehicle is traveling and the clutch mechanism is in the coupled state, the control means executes an operation plural times in which operation the maximum transmittable torque is decreased from a present value by a first predetermined amount every time a predetermined condition is satisfied, wherein the control means is configured to increase the maximum transmittable torque from the present value by a second predetermined amount when at least one of the first left and right wheels is determined to have caused slippage in a state in which the clutch mechanism is in the coupled state, and wherein in the case where the vehicle stops in a state in which the clutch mechanism is in the coupled state and the vehicle starts after that time, the control means maintains the maximum transmittable torque to be zero while the vehicle stops and when the vehicle starts, the control means sets the maximum transmittable torque to a value which is obtained by subtracting, from a value of the maximum transmittable torque at the time of a previous start of the vehicle, a total decrease amount increased on a basis of the first predetermined amount in a period between the previous start of the vehicle and a present stoppage of the vehicle, and adding, to the value at the time of previous start of the vehicle, a total increase amount increased on a basis of the second predetermined amount in a period between the previous start of the vehicle and the present stoppage of the vehicle.

* * * * *